United States Patent [19]

Nold

[11] Patent Number: 4,825,531

[45] Date of Patent: May 2, 1989

[54] METHOD OF MAKING A GENERATOR STATOR RETENTION SYSTEM

[75] Inventor: Robert D. Nold, Rockford, Ill.

[73] Assignee: Sundstrand Corporation, Rockford, Ill.

[21] Appl. No.: 173,575

[22] Filed: Mar. 25, 1988

Related U.S. Application Data

[62] Division of Ser. No. 945,649, Dec. 22, 1986, Pat. No. 4,764,699.

[51] Int. Cl.$^4$ .................... H02K 5/00; H02K 15/00
[52] U.S. Cl. .................................. 29/596; 29/447; 29/525.1
[58] Field of Search ............ 29/447, 596, 525.1; 310/113, 114, 89, 91, 42, 162, 165, 218, 254, 258, 259, 54, 56, 680

[56] References Cited

U.S. PATENT DOCUMENTS

| | | | |
|---|---|---|---|
| 1,978,100 | 10/1934 | Buerlee | 310/259 |
| 2,338,593 | 1/1944 | Mortensen | 310/524 X |
| 2,611,797 | 9/1952 | Beckwith et al. | 310/514 X |
| 2,677,065 | 4/1954 | Van Der Heem | 310/258 |
| 2,683,830 | 7/1954 | Stacy | 310/54 |
| 3,562,564 | 2/1971 | Potter | 310/54 |
| 3,789,249 | 1/1974 | Purnam | 310/54 |
| 4,110,643 | 8/1978 | Muller | 310/54 |
| 4,123,678 | 10/1978 | Jacoby | 310/42 |
| 4,204,313 | 5/1980 | Khutorestsky et al. | 310/42 |
| 4,250,423 | 2/1981 | Linscott, Jr. | 310/258 |
| 4,262,224 | 4/1981 | Kofink | 310/254 |
| 4,297,784 | 11/1981 | Vagman | 29/447 X |
| 4,514,652 | 4/1985 | Olson | 310/54 |
| 4,538,084 | 8/1985 | Kawada et al. | 310/217 |
| 4,742,259 | 5/1988 | Schaefer et al. | 29/447 X |

OTHER PUBLICATIONS

Integrated Drive Generators for Aircraft; R. J. Keneett; Electronics & Power; Feb. 1971 (vol. 17); pp. 73–76.

Primary Examiner—Timothy V. Eley
Attorney, Agent, or Firm—Wood, Dalton, Phillips, Mason & Rowe

[57] ABSTRACT

An oil-cooled generator (10) is provided having a housing (20) with a gas-filled interior and rotor (46,56) therein. A stator (44,58) associated with the rotor (46,56) is secured to a surrounding sleeve (70',70) by an interference fit and pins (72',72). A bolt (84',84) is secured in an opening (82',82) in the housing (20) to fix the sleeve (70',70) thereto, the housing opening (82',82) being open only to the housing interior. The housing (20) is provided with grooves (76) therein and a ring (78) is secured to the inner diameter of the housing (20) to secure those grooves (76) to define oil passages (74) therein.

4 Claims, 1 Drawing Sheet

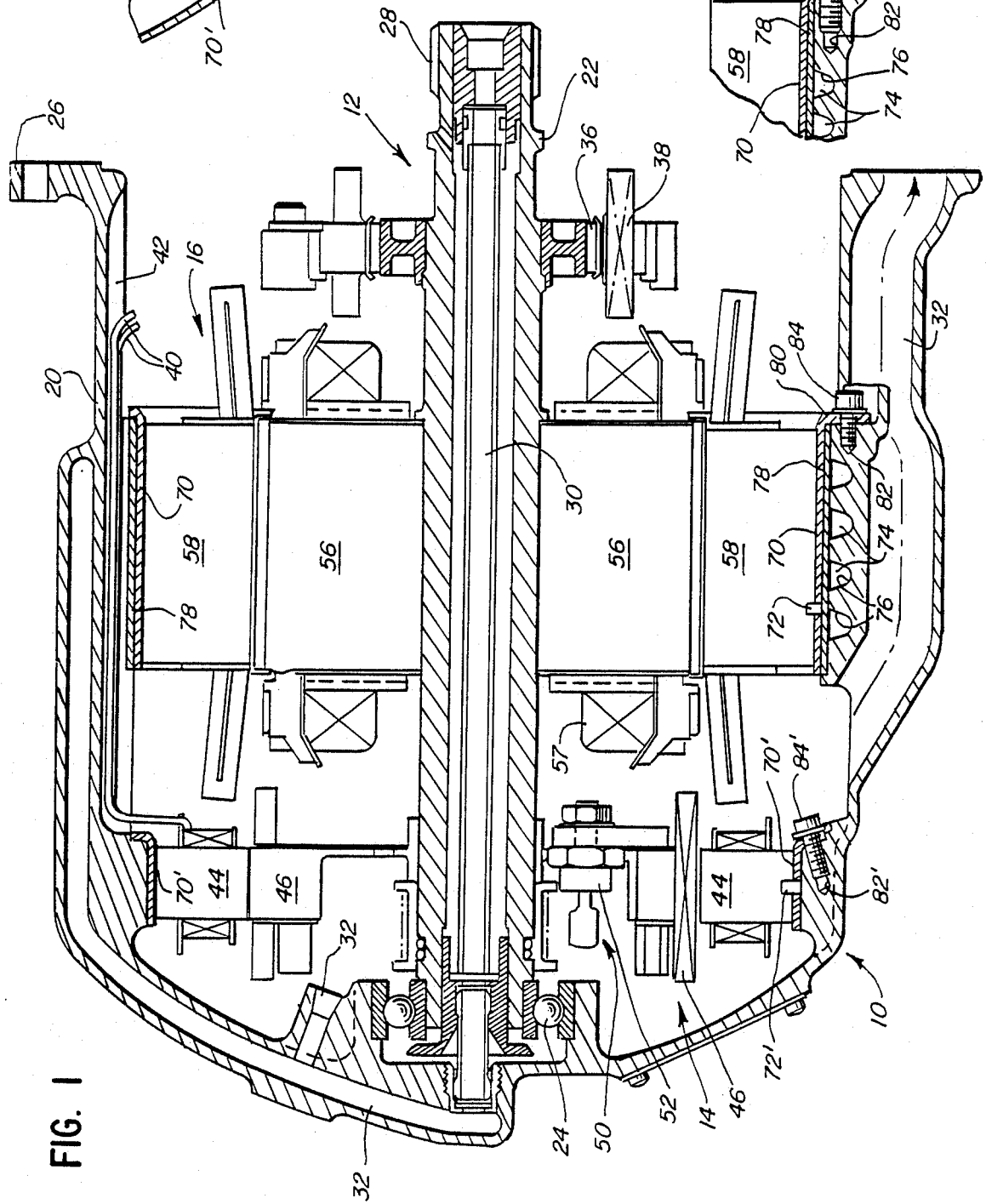

4,825,531

METHOD OF MAKING A GENERATOR STATOR RETENTION SYSTEM

This is a division of application Ser. No. 945,649 filed Dec. 22, 1986, now U.S. Pat. No. 4,764,699.

TECHNICAL FIELD

The present invention relates to generators and more particularly to the retention of stators in generators subject to extreme environmental conditions.

BACKGROUND OF THE INVENTION

Generators are, of course, widely used in aircrafts to generate the electrical power required in the many systems on board the aircraft. Such generators are naturally subjected to extreme environmental conditions. For example, in high performance aircraft, the generator will be subjected to ambient pressure altitudes from −1000 to 80,000 feet and to ambient temperatures from −65° F. to 700° F. In order to maintain proper conditions within the generator, it is therefore frequently necessary to provide a sealed generator housing allowing for retention of the gas provided in the generator (i.e., nitrogen is provided to keep moisture out of the generator and to provide a positive pressure to enhance oil scavenge), and such a sealed housing is also necessary in order to allow for proper circulation of cooling and lubricating oil without leakage.

Providing such a sealed generator housing has heretofore been difficult in view of the necessity of properly mounting the components within the housing. For example, the stators provided in a generator must be accurately positioned both radially and axially within the housing while subjected to magnetic and vibrational forces at high temperatures. Many structures heretofore used to secure such stators have tended to provide undesirable stress concentrations in the housing, undesirable heat concentrations, and/or potential leaks through the housing.

One such structure is disclosed in Linscott, Jr. U.S. Pat. No. 4,250,453, which uses a two ring interference fit with a coacting axial force developed by spring clips.

The present invention is directed toward overcoming one or more of the problems as set forth above.

SUMMARY OF THE INVENTION

In one aspect of the present invention, an oil-cooled generator is provided having a housing with a gas-filled interior and rotor therein. A stator associated with the rotor is secured to a surrounding sleeve by an interference fit and pins. A bolt is secured in an opening in the housing to fix the sleeve thereto, the housing opening being open only to the housing interior.

In another aspect of the present invention, the housing is provided with grooves therein and a ring is secured to the inner diameter of the housing to define, together with the grooves, oil passages.

It is an object of the present invention to secure a stator in a generator housing to prevent the same from rotating and/or moving axially. It is another object of the present invention to provide a generator housing which is sealed against leaking in extreme environmental conditions. Still another object of the present invention is to provide a generator with adequate coolant to maintain appropriate generator temperatures. Yet another object of the present invention is to provide a generator with minimal stress concentrations on its housing.

DESCRIPTION OF THE DRAWINGS

FIG. 1 is a simplified cross-sectional view of a three-phase generator embodying the present invention; and FIGS. 2 and 3 show detail of the present invention.

BEST MODE FOR CARRYING OUT THE INVENTION

A gas-filled, oil-cooled generator 10 with which the present invention may be used is illustrated in FIG. 1. The generator 10 illustrated is a 400 hz., three-phase synchronous generator with a permanent magnet generator (PMG) 12, an exciter 14, and a main generator 16. This generator is specifically designed to operate in high performance aircraft, which in turn requires that the generator operate in ambient pressure altitudes from −1000 to 80,000 feet and ambient temperatures from −65° F. to 700° F.

Though the three-phase synchronous generator 10 will be presently described to provide a reader with a general understanding of the environment of the invention, it will be understood by the skilled artisan that the present invention could be used with still other types of generators.

Referring now to the generator 10 of FIG. 1, a housing or main casting 20 suitably supports a rotor shaft 22 for rotation therein, as by the ball bearings 24 shown. A flange 26 is provided on one end of the housing 20, allowing the housing 20 to be suitably sealed and supported on a constant speed drive (not shown). The rotor shaft 22 has a geared end 28 adapted to mesh with a suitable drive gear (not shown) for rotating the shaft 22.

The shaft 22 also includes a central opening 30 for cooling and lubricating oil. The housing 20 communicates with the shaft opening 30 and defines a number of channels 32 through which the cooling oil circulates.

Referring now to the electrical components, the PMG 12 includes a permanent magnet rotor 36 which, when rotated by the shaft 22, creates a three-phase current in the PMG stator 38, which current is sent to a remote rectifier (not shown).

Suitable wires 40 (not fully shown) extending through a groove 42 in the housing 20 connect the direct current from the remote rectifier to the winding of a stator 44 of the exciter 14. The exciter stator 44 accordingly creates a magnetic field and, as the exciter rotor winding 46 rotates (with the rotor shaft 22) therein, a three phase alternating current is created in the rotor winding 46.

A rectifier assembly 50 having diodes 52 (the assembly being known as a "rotating full wave bridge") rectifies the exciter rotor alternating current and the rectified signal is sent to the main generator rotor 56 and the main field winding 57 thereof.

The main generator rotor 56 accordingly creates a magnetic field which (carried by the drive shaft 22) rotates within the main generator stator 58 to generate electrical power for the aircraft in the windings of the main generator stator 58. The output power is taken off the stator end turns by a suitable lead assembly (not shown) which transfers the power for use outside the generator 10.

The present invention relates to a structure which may be used to mount both the main generator stator 58 and the exciter stator 44 of the generator housing 20. Referring first to the retention of the main generator stator 58, a sleeve 70 is provided around the main generator stator 58. In order to secure the sleeve 70 and stator 58 together, the inner diameter of the sleeve 70 and the outer diameter of the stator 58 are properly machined to allow an interference fit therebetween. To assemble the two together, the sleeve 70 is then heated and shrunk onto the stator 70. The sleeve/stator assembly is then drilled and radially directed pins 72 inserted therein to prevent any shifting in the event the interference fit should thereafter become loose. One arrangement of the pins 72 which has been found to work uses six pins 72 in two groups of three, with one group of pins 72 staggered with respect to the other.

The outer diameter of the sleeve 70, after the sleeve 70 is assembled to the stator 58, is then machined to the desired size.

Assembly of the housing 20 may also be done at that time. Specifically, a plurality of annular coolant or so-called back iron passages 74 are defined by grooves 76 formed in the housing 20. The inner diameter of the housing 20 at that location is machined to a desired size. An outer sleeve or ring 78 is machined to define an outer diameter greater than the housing inner diameter to provide an interference fit with the housing inner diameter. Assembly is accomplished by heating the housing 20 prior to mounting the sleeve 78 therein. With the ring 78 assembled in the housing 20, the coolant passages 74 are closed off for proper operation. The assembled ring 78 is then machined to define an inner diameter less than the outer diameter of the stator 58 to provide an interference fit with the assembled sleeve 70 and stator 58. Assembly of the sleeve 78 to the stator 58 is accomplished by heating the sleeve 78 (and housing 20 if already assembled to the sleeve 78) prior to dropping the stator 58 in the sleeve 78.

As best shown in FIG. 2, a flange 80 is provided around the sleeve 70 with openings therein. The housing 20 includes blind bores or bolt holes 82 which do not extend completely through the housing 20 so that the holes 82 are open only to the interior of the housing 20. Bolts 84 in the bolt holes 82 connect the flange 80 to the housing 20. Preferably, three bolts 84 at 120° spacing are used, to ensure against movement should the interference fit become loose.

As shown in FIGS. 1 and 3, a similar assembly may be used with the exciter stator 44 with a sleeve 70' having an interference fit on the stator 44 and further secured by pins 72'. The outer diameter of the sleeve 70' is also interference fit directly with the housing 20 and further secured by bolts 84' in blind bores or bolt holes 82'. In view of the low electrical power levels at the exciter stator 44, coolant passages such as those provided about the main generator stator 58 are not required. Of course, the exciter stator 44 must be installed in the housing 20 before installing the main generator stator 58.

The above-described assemblies accordingly secure the stators 44, 58 from rotating and moving axially. The pins 72, 72' act to mechanically prevent relative rotation while the bolts 84, 84' anchor the components against both relative rotation and axial movement; and this is accomplished without penetration of the housing 20 by the pins 72, 72' or bolts 84, 84'. Further, since no bolts extend through or penetrate the housing 20, the housing 20 is well sealed against leaking, an important factor in view of the environmental conditions in which the generator 10 must operate.

Further, with the main generator 16, the ring 78 allows for the formation of desired coolant passages 74, thereby allowing the metal temperatures to be maintained fairly constant to help ensure the interference fits. The ring 78 also evenly distributes the stresses at the interface with the sleeve 70. Still further, the ring 78 acts as a buffer in protecting the cast housing 20 during cool down, and thus the stresses in the housing 20 at low temperatures are minimized.

Other aspects, objects and advantages of the present invention can be obtained from a study of the drawings, the disclosure and the appended claims.

I claim:

1. A method of mounting a stator in a generator housing, comprising the steps of:
    mounting a sleeve on said stator with an interference fit therebetween;
    inserting pins through said sleeve and into said stator;
    forming a bolt hole in said housing, said hole open only to the housing interior;
    mounting said stator and sleeve in said housing with an interference fit therebetween; and
    extending a bolt through said sleeve and into said bolt hole.

2. The method of claim 1, wherein the sleeve and stator interference fit is provided by machining the sleeve to define an inner diameter less than the stator outer diameter, and said sleeve is heated prior to mounting on the stator.

3. The method of claim 2, wherein the sleeve and housing interference fit is provided by machining the housing to define an inner diameter less than the sleeve outer diameter, and said housing is heated prior to mounting the sleeve therein.

4. The method of claim 1, further comprising the steps of:
    forming grooves in said housing;
    mounting a ring over said housing grooves to define coolant passages, said ring having an interference fit with said housing;
    wherein said sleeve and stator are mounted in the ring by an interference fit between the sleeve and ring.

* * * * *